UNITED STATES PATENT OFFICE.

THOMAS B. ARMITAGE, OF NEW YORK, N. Y.

IMPROVEMENT IN THE PROCESSES OF DISINTEGRATING WOODY FIBER FOR PAPER-PULP.

Specification forming part of Letters Patent No. 142,550, dated September 9, 1873; application filed July 13, 1872.

*To all whom it may concern:*

Be it known that I, THOMAS B. ARMITAGE, of the city, county, and State of New York, have invented a new and useful Improvement in Process for Disintegrating Woody Fiber, of which the following is a specification:

My invention relates to an improved process for treating alkali-saturated woody matter, in the disintegration of wood fiber, for the purpose of making paper-pulp. The woody matter is reduced to small and uniform pieces, and then saturated with caustic alkali by any of the known means or processes, which reduction and saturation form no part of my invention. My invention consists as follows: I take the chips thus prepared and saturated, drain off the superabundant liquor, insert the mass into a revolving boiler, and subject it to a heat of between 300° and 400° Fahrenheit for the space of about one hour, more or less. I apply the heat, in the form of steam under pressure, directly into the revolving vessel, in contact with the mass undergoing revolution upon an axis horizontal, or nearly so. The advantages attained are as follows: First, it is well known that, under the influence of heat, the caustic alkali acts upon the albuminous and glutinous substances contained in the wood, and forms with them a dark liquid dye, which rapidly discolors the fiber. This is due to the fact that the liquor is being rapidly strengthened by evaporation. Steam, in direct contact with the chips retained under pressure, communicates the desired heat without causing evaporation and consequent strengthening of the liquid dyes. Second, the rotation of the mass prevents dripping, and permits the steam to act uniformly and at once upon chips in a uniform state of moisture, causing all to reduce at the same moment. Third, by combining the rotation with the steam in direct contact under pressure, the process is accelerated, so that reduction is accomplished in a much shorter length of time. Fourth, the alkali solution, retaining its full amount of water and no more, acts uniformly at all stages of the process, which, together with the conditions of direct heat and rotation, yields a quick and perfect disintegration, while, the mass having been so short a time in contact with the coloring compounds, and they being in so dilute a form, the result is a fiber that, for nearly all purposes, can be used without bleaching.

I know that chips in a stationary boiler have been subjected to the action of steam under pressure in direct contact with the mass; also, that chips in a rotary vessel have been subjected to external heat; but I am not aware of any process, such as I have herein described, by which a whiter product is obtained directly from the saturated chips, and at a saving of time and labor.

Having thus described my invention, what I claim as new, and desire to secure by Letters Patent, is—

The within-described process of disintegrating woody fiber, wherein the alkali-saturated mass, in a revolving vessel, is subjected to the direct action of steam under pressure, substantially as and for the purposes set forth and described.

THOMAS B. ARMITAGE.

Witnesses:
T. B. MOSHER,
C. SEDGWICK.